United States Patent [19]

Lenoble et al.

[11] Patent Number: 4,674,702
[45] Date of Patent: Jun. 23, 1987

[54] CASSETTE SYSTEM HAVING QUICK CONNECT FEATURE

[75] Inventors: Bert I. Lenoble, Colonia; Richard M. Krehely, Fort Lee, both of N.J.

[73] Assignee: Allied Corporation, Morris Township, Morris County, N.J.

[21] Appl. No.: 578,974

[22] Filed: Feb. 10, 1984

[51] Int. Cl.⁴ .................... G03B 1/04; G11B 15/32; G11B 23/04
[52] U.S. Cl. .................... 242/195; 242/197; 226/92; 352/235
[58] Field of Search .................... 242/192, 195, 197; 226/91, 92; 352/235; 360/95, 137; 353/11, 12; 354/345

[56] References Cited

U.S. PATENT DOCUMENTS

| | | | |
|---|---|---|---|
| 2,606,409 | 8/1952 | Gordon | 352/235 |
| 2,635,372 | 4/1953 | Field | 353/12 |
| 3,074,662 | 1/1963 | Herman | 242/205 |
| 3,136,464 | 6/1964 | Schmid | 226/91 |
| 3,153,516 | 10/1964 | DeLoof et al. | 242/195 |
| 3,197,150 | 7/1965 | Camras | 242/195 X |
| 3,257,515 | 6/1966 | Nakamatsu | 352/235 X |
| 3,620,893 | 11/1971 | Tarrson | 352/235 |
| 3,628,744 | 12/1971 | Martin . | |
| 3,706,423 | 12/1972 | Neff | 242/195 |
| 3,783,197 | 1/1974 | Towner | 242/192 X |
| 3,934,840 | 1/1976 | Inaga | 242/195 |
| 4,432,508 | 2/1984 | Inoue | 242/195 |
| 4,572,460 | 2/1986 | Hertrich | 242/195 |

FOREIGN PATENT DOCUMENTS

| | | |
|---|---|---|
| 371327 | 3/1923 | Fed. Rep. of Germany . |
| AUS1812211 | 7/1969 | Fed. Rep. of Germany . |
| 1547015 | 10/1969 | Fed. Rep. of Germany 242/195 |
| 517313 | 2/1972 | Switzerland . |

Primary Examiner—John M. Jillions
Attorney, Agent, or Firm—Stanley N. Protigal; Howard G. Massung

[57] ABSTRACT

Film (13) in a film cassette (15) is connected to a take-up reel (19) in a film transport mechanism (11) by means of mating connectors (20,30) attached to leaders (27,29) on the cassette film (13) and on the take-up reel (19). The connectors (20,30) are retained in contoured slots (41,51) on the cassette (15) and on the film transport mechanism (19) so that when the cassette (15) is loaded onto the transport mechanism (19), the connectors (20,30) will be in alignment. By arranging the connectors (20,30) for connection and disconnection in a direction perpendicular to the direction of travel of the film (13), an efficient connection can be effected and the connection remains stable during the operation of the film transport mechanism (11). In order to avoid the connectors (20,30) causing a distortion in the contour in the film (13) after winding onto the take-up reel (19), the leader (29) attached to the take-up reel (19) is provided with apertures (57) which, when the film (13) is wound around the take-up reel (19), are in alignment with the mated connectors (20,30).

The use of the mating connectors (20,30) establishes a fixed relationship in the spacing between the film leader (29) on the take-up reel and an "initial" position on the film (13). If the film (13) is controlled in its position by a sprocketed capstan (35), the use of the mating connectors (20,30) reduces the possibility of positional error occurring as a result of an inaccuracy in the positioning of the film (13) when loading.

14 Claims, 5 Drawing Figures

CASSETTE SYSTEM HAVING QUICK CONNECT FEATURE

BACKGROUND OF THE INVENTION

This invention relates to end feeding of webs from cassette packages, and more particularly to a system for accurate and automatic connection of a web from a cassette reel to a take-up mechanism in a transport assembly which is external to the cassette. The inventive system is particularly advantageous when used with non-continuous lengths of sprocketed film mounted about a single reel in a cassette.

Cassette loading systems for feeding continuous webs must include a provision for some means to drive a web feeding mechanism. In some cases, it is not necessary to accurately position the web. In cases where it is necessary to accurately position the web, some means of providing information relating to initial position must be included either as information on the web or from a drive mechanism.

In mechanisms using a web feed, it is desireable that most of the web feed mechanism be located outside of the cassette, in order that a single web feed mechanism may be used for a plurality of cassettes.

Film in a continuous web, when unreeled from a cassette, must be wound onto the take-up reel in order to economize on space. If a specialized connector is used at the beginning of the film, this connector can cause the film to bulge at the place on the take-up reel where the connector rests. For this reason, film systems using connectors have not been popular. On the other hand, a connector establishes a positive positioning device. On systems in which it is established that a connector attachment must first be effected in order to effect transport of the film, it is very difficult to inadvertently position the film at an incorrect initial position. The only remaining sources for positional error would then be programming errors and errors derived from misinformation.

In vehicle mounted moving map displays, it is desired that the vehicle's position and orientation correspond to a set of coordinates shown on the displayed map. When map information is provided in the form of a photographic film strip, the information contained in the film strip does not readily convey positional information. Directional orientation and a "y" position are determined by an orientation of a flying spot scanner's raster with respect to the direction and width, respectively, of the film strip, or in a similar manner by mechanical movements. The "x" position, on the other hand, is determined by the distance to which the film is transported out of the cassette feed reel to the mechanism's take-up reel. Film cassettes containing this type of map information are typically indexed by sprockets along the edges of film strip. For example, in one application, 35 mm film which meets the specifications of American National Standard Motion Picture Film is used. Positioning information is provided by a sprocketed capstan. The capstan's total rotational travel is indicated by an encoder assembly driven by the capstan. It is important that the initial position of the film be accurately established in order that a substantial initial positioning error not be transferred to subsequent film indicia.

While it is important that the map be accurately positioned with respect to the vehicle for the purposes of the external visual reference of the pilot or vehicle operator, overlay information is typically provided on a moving map display in conjunction with the map material. For example, a down-looking radar assembly may provide such overlay information, in which the overlay information is expected to more-or-less coincide with the map information. It is important that other information, such as target designations, also coincide with information provided on the map.

In order to accurately establish the initial "x" position of the film strip, it is necessary to carefully feed film leader from the cassette to film leader attached to the take-up mechanism. If this feeding is accomplished to the accuracy of the nearest sprocket, it is possible to identify the initial position of the film strip. Such a procedure has entailed cumbersome manipulation of film leader and was prone to cause positional inaccuracy as a result of the film being inaccurately positioned with respect to its initial sprocket position. Furthermore, prior art manual attachment of film leader from the cassette to film leader in the take-up assembly requires a great deal of manual manipulation of the film in order to achieve the desired result. In cases where the film is inaccessible or where time between different sorties is critical, such as requirement for manual manipulation of film leaders in a map reading system is not acceptable.

It is desired to provide an arrangement for efficiently and accurately connecting film leaders in a cassette to a film leader attached to a cassette drive mechanism. It is therefore an object to provide a quick connect feature for rapidly loading film cassettes. It is a further object to provide a system in which loaded film cassettes are accurately positioned with respect to their initial film position. It is a further object to provide a system for loading film cassettes in which the film or film leader need not be manipulated in order to load the cassette. It is also an object to provide a film cassette loading system in which a film cassette can be loaded into a receiving drive mechanism in a place in which manuevering or visual inspection of the film would be difficult.

SUMMARY OF THE INVENTION

In accordance with the present invention, a film cassette loading system is provided in which film leader attached to a take-up spool in a film transport assembly is mated with film leader on a cassette. The mating is accomplished by a mechanical pin-and-socket connector pair, in which the pin and the socket have axes parallel to a transverse line on the film. Mating is accomplished when the film cassette is loaded into the film transport assembly. The connectors are retained in a position for engagement and disengagement by retainer arrangements on the cassette and on the transport assembly. The retainer arrangement on the cassette provides retention force for the cassette's connector when the connector is in the engagement/disengagement position, while allowing the film to move freely past the retainer arrangement after the film web has begun to be played into the transport assembly.

In order to prevent the connectors from creating a distorting lump when the film is wound around the transport assembly's take-up spool, a recess is provided on the take-up spool and corresponding apertures are provided on the transport assembly's film leader. The apertures and recess correspond to the wound position of the connectors against the take-up spool. The film leader from the cassette then acts to press the connector pair through the apertures in the film leader and toward the recess in the take-up spool. As a result, film which is wound around the take-up spool retains a relatively circular profile, while allowing the mating pair of connectors to be wound about the inside of the film roll.

In one embodiment, the invention contemplates a single film cassette design for an optical or electronic map reader device in which the cassette contains a single spool which contains the map information on film. The cassette housing completely encloses the film to protect the film from damage due to handling and to provide a means for film storage. The invention provides for automatic engagement of the film to a film leader installed in the map reader and eliminates the need for a delicate threading and calibration operation. Indexing of the film is accomplished through a film sprocket which is geared to a plurality of position transmitters which determine the film positioning for any area of the map. One section of film leader remains in the map reader attached to a take-up spool and initially engages the film sprocket. A first mechanical connector attached to the film leader is captured in a contoured slot in a film gate and is held in position. When the cassette is installed, a mating connector which is attached to the film in the cassette engages the first coupler. Upon a command to advance the film, the film gate is opened, thus permitting a drive motor on the film take-up spool to advance the film out of the cassette. To remove the film cassette, the film must be rewound into the cassette. When the film is rewound into the cassette, the film gate closes and captures the coupler, thus permitting the cassette to be removed.

By providing such an arrangement, the film is automatically positioned to an accuracy such that the initial sprocket location can be determined. Furthermore, quick changes of film cassettes can be effected and visual inspection of the connection is unnecessary.

DETAILED DESCRIPTION OF THE PREFERRED EMBODIMENT

Figure 1:
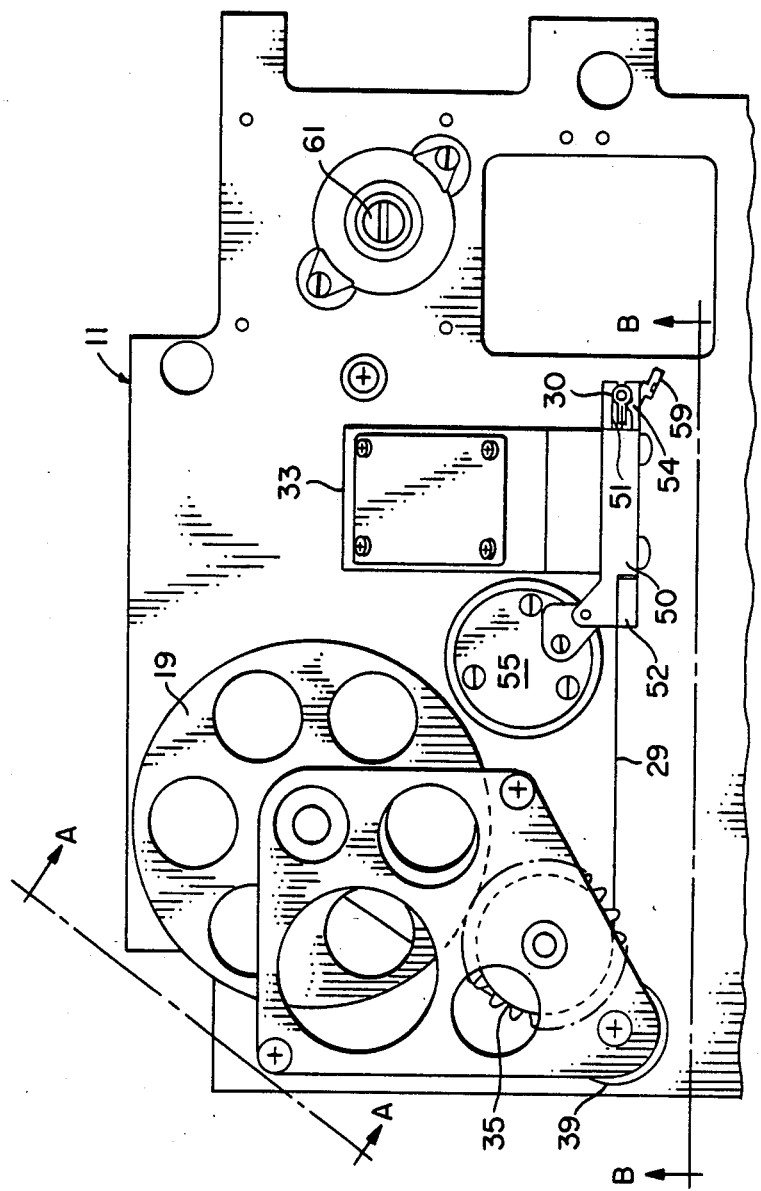
FIG. 1 is a top view, showing a film transport mechanism adapted to receive a film cassette in accordance with a preferred embodiment of the present invention.

This invention relates to feeding of webs, such as continuous film strips for a moving map display. Typically, information from such film strips is optically read at a film transport mechanism 11, shown in FIGS. 1 and 2. The film transport mechanism 11 withdraws film 13 from a film cassette 15, shown in FIG. 3. While two-reel film cassettes are known, the present invention uses film cassettes, such as film cassette 15, which have a single reel known as a supply reel 17. The film transport mechanism 11 houses a second reel known as a take-up reel 19. The take-up reel 19 is located in the film transport mechanism 11 partly because the film transport mechanism 11 must be fairly complex in order to accurately determine the distance that the film 13 has been taken up by the film transport mechanism 11.

Figure 2:
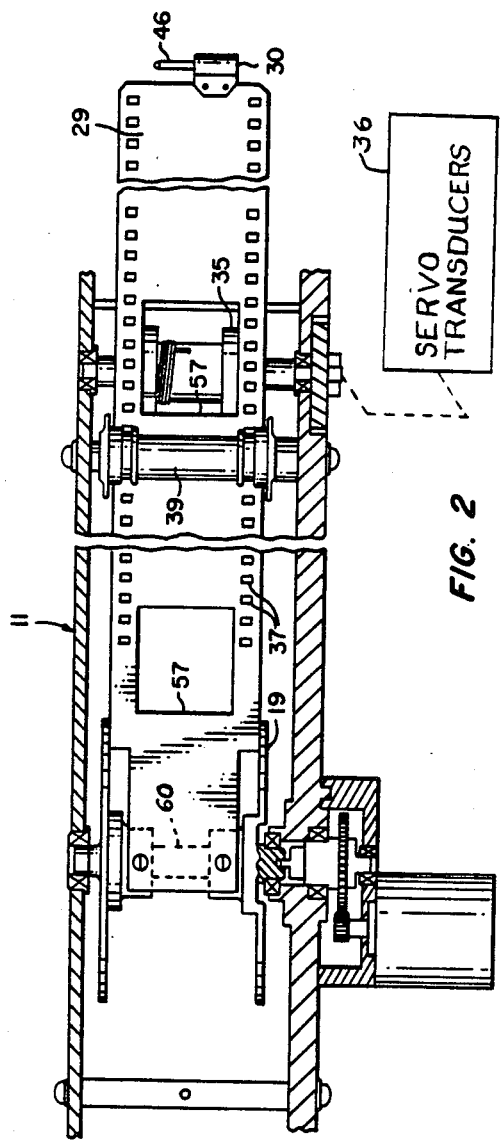
FIG. 2 is a "stretch out" drawing of the film transport mechanism of FIG. 1, taken along lines A—A and B—B of FIG. 1.

As will be seen later, the film 13 in the cassette includes a mechanical connector 20 which is retained in an initial position (shown in FIG. 3) by a catch 22. Typically, the film 13 begins with a leader portion 27 which is identical to the remaining portion of the film 13, except that normal film information is not carried on the leader 27 and the leader 27 often has more strength than the remaining portion of the film 13. Referring to FIGS. 1 and 2, the film transport mechanism 11 has associated with it, film take up leader 29, which is attached to the take-up reel 19. The take-up leader 29 has, associated with it, a mechanical connector 30, which can mate with the connector 20 associated with the film 13 on the cassette 15.

The film transport mechanism 11 includes an optical assembly such as a flying spot scanner (FSS) 33 (partially shown) and a film position transducer. The film position transducer includes a sprocketed capstan 35 which is geared to a series of servo transducers 36 which are capable of providing an indication of the number of turns that the sprocketed capstan 35 has rotated. In the preferred embodiment, three servo transducers are adequate to provide an indication of film positioning for any area of the map. The film 13, and film leaders 27, 29 include a series of evenly spaced sprocket holes 37 in accordance with standard film practice. In the preferred embodiment, 35 mm film is used and the sprocket holes are provided with dimensions per American National Standard Motion Picture Film standards. It is also possible to use film having different dimensions and different sprocket standards. The film 13 has an "initial" position in which map information to be displayed begins. Since the map information does not readily electronically identify itself with navigational data, the "initial" position must be established by further inputs to the transport mechanism's control system (not shown). By measuring this distance of the cassette's film leader 27 to the "initial" position, and by measuring the distance that the cassette film leader must travel in order to engage the sprocketed capstan 35, the distance that the film must travel to reach the "initial" position is established. The film position transducer is then able to determine the distance of film travel essentially by counting the number of sprocket holes 37 which the sprocketed capstan 35 engages. An idler capstan 39 is used to retain the film 13 in engagement with the sprocketed capstan 35.

In the preferred embodiment, the position of the transport assembly's film leader 29 at the start of engagement is determined by the physical constraints of the transport assembly 11. The sprocketed capstan 35 therefore merely follows the position of the film 13 or film leader 27, 29. It is important that the distance between the capstan 35 and the film transport mechanism's optical system 33 by fixed within a desired accuracy of calibration. However, when the film transport's take-up leader 29 is connected to the cassette's leader 27, the respective connectors 30, 20 are mated as will be described and maintain the fixed relationship of the film 13 with respect to the sprocketed capstan 35. It is important only that this accuracy be maintained to an extent necessary for allowing the sprocketed capstan 35 to engage sprocket holes 37 on the cassette's leader 27 successively after engaging sprocket holes on the transport assembly's take-up leader 29. After the connectors 20, 30 have passed the sprocketed capstan 35, the position of the film 13 depends upon the capstan 35 engaging successive sprocket holes 37 on the film strip 13, rather than on the possible movement of the connectors 20, 30. This is also important because the film 13 may slightly change its physical dimensions with age and changes of temperature, but distances from specific map features to nearby sprocket holes 37 is not subject to cumulative error and will not be significantly changed despite changes in the total length of the film strip 13.

It should be noted that, while the use of the mating connectors 20, 30 allows the "initial" position of the film strip with respect to leader 29 to be pre-determined, the invention would work equally well with a system in which the "initial" position is given by electronically readable data on the film strip 13 itself. Thus, the present invention can be used with a system in which electronic data may or may not be encoded on the film. Conversely, the present system can ignore such film-encoded data, provided that the position of the cassette's connector 20 is known.

Figure 3:
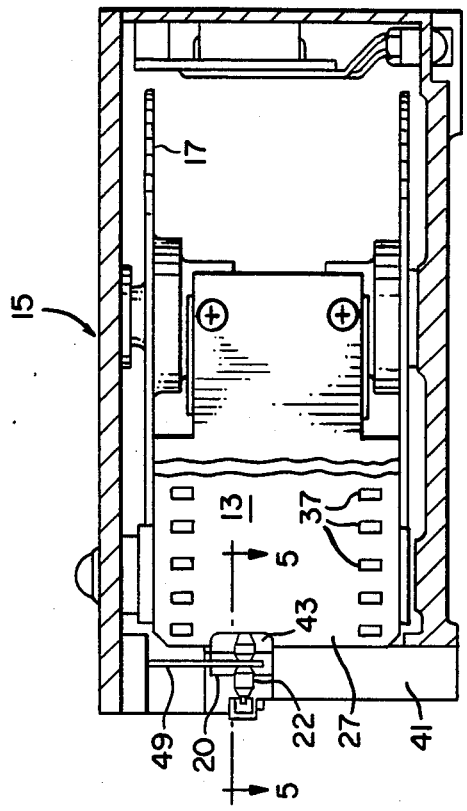
FIG. 3 shows a film cassette constructed in accordance with the present invention.
Figure 5:
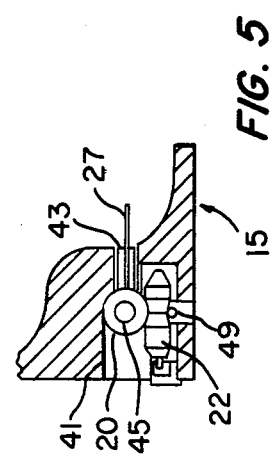
FIG. 5 is a partial view of the film cassette of FIG. 2 taken along lines S—S of FIG. 3, showing details of the connector retainer assembly used in accordance with the preferred embodiment of the invention.
Figure 4:
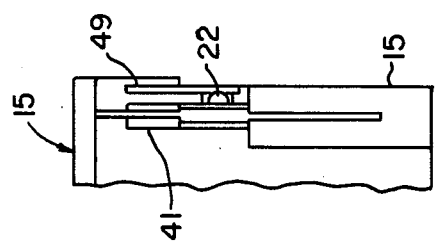
FIG. 4 is a partial end view of the film cassette of FIG. 3.

Referring to FIGS. 3-5, the film 13 from the cassette 15 is fed from the cassette 15 through a slot 41. Referring to FIG. 5, slot 41 is contoured so that the cassette's connector 20 can be drawn only partially into the slot 41. The cassette's connector 20 has a cylindrical outer contour and includes a flange 43, which attaches to the film leader 27. The cylindrical shape of the connector 20 has an axis which extends parallel to the transverse direction of travel of the film 13. Referring to FIG. 1, connector 30 on the transport mechanism's film leader 29 has a similar profile. Referring also to FIGS. 2 and 5, one of the connectors 30 has a bore 45 along its center axis which is designed to engage a corresponding pin 46 on the other connector 30. The pin and bore are aligned perpendicularly to the direction of travel of the film 13 and therefore engage the connectors 20, 30 without urging the connectors 20, 30 to separate during travel of the film 13. On the other hand, if the cassette 15 is placed into position on the film transporter mechanism 11 by a movement perpendicular to the direction of travel of the film 13, alignment of the pin 46 with the bore 45 causes the connectors 20, 30 to automatically become engaged upon insertion of the film cassette 15. It turns out that insertion of the film cassette 15 perpendicularly to the direction of travel of the film 13 is convenient because the perpendicular movement avoids any displacement of the film 13 in the direction of travel during the insertion process.

In order to retain the cassette's film connector 20 in an appropriate position for engagement, the cassette's slot 41 has a contour which determines the position of the cassette's connector 20. In order to maintain that position, the catch 22 engages the cassette's connector 20 so as to create a force to bias that connector 20 to remain in its start position. This biasing force is supplied by a cantilever rod spring 49, which presses against the catch 22 so as to create the biasing force. The amount of travel of the catch 22 is such that, when the narrower film 13 passes through the slot 41, the catch 22 does not engage the film 13.

Referring to FIG. 1, a film gate assembly 50 supports the take-up film leader 29 or the film 13 at the flying spot scanner 33. The film gate assembly 50 terminates with a contoured slot 51, although a catch corresponding to catch 22 is not used on the transport mechanism 11. Instead, the transport mechanism 11 unwinds the transport mechanism's film leader 29 until its connector 30 engages against its slot 51. The film gate assembly 50 includes a film gate 52 which is caused to pivot open by a solenoid 55. This pivoting open enables the film, which typically is transported at speeds up to about 20 meters/minute, to clear the film gate assembly during such high speed transport.

The film gate 52 extends to contoured slot 51 and includes an articulated half 54 of slot 51. The movement of the film gate 52 including the articulated half 54 of slot 51 allows connector 30 to be released from the transport mechanism's contoured slot 51 whenever the film gate 52 is opened.

It is also possible to avoid the use of an articulated part 54 of slot 51. Since the wide part of slot 51 faces the direction of the take-up reel 19, excess movement of the transport mechanism's film leader 29 to an unwound position would cause the transport mechanism's connector 30 to press against its slot 51 and consequently cause the leader 29 to buckle, presumably in a non-destructive fashion.

Referring to FIG. 1, a tab 59 is pivotably mounted at the transport mechanism's contoured slot 51. The tab 59 is positioned so that the transport mechanism's connector 30 displaces the tab 59 to a "release" position (shown) when connector 30 is present in the slot 51. The tab 59 is biased against such displacement so that when connector 30 is not in the slot 51, the tab 59 moves to a "lock" position. The function of the tab 59 is to prevent the cassette 16 from being removed or fully inserted when connector 30 is not in position. Therefore the cassette cannot be removed with the film 13 from the cassette 15 partially withdrawn. Secondarily, the tab 59 mandates that connector 30 be in approximate alignment at the slot 51 prior to inserting the cassette 15.

After engagement, the connectors 20, 30 are aligned, as established by the bore 45 and the pin 46. This establishes the distance between the sprockets on the cassette's film 13 and leader 27, and the position of the transport mechanism's take-up leader 29.

As the take-up reel 19 takes in the film 13, the connectors 20, 30 are necessarily wound around the take-up reel 19. As can be seen, the connectors 20, 30 are considerably thicker than the film 13. This would necessarily create a bulge in the film 13 as the film is wound around the take-up reel 19. In order to avoid this, the take-up reel 19 has a recess 60 at its hub. A series of apertures 57 are provided in the take-up leader 29 in order to allow the connectors 20, 30 to move inwardly against the hub recess 60 as the film 13 is wound around the take-up reel 19. The position of the apertures 57 is, therefore, determined by the anticipated alignment of apertures 57 with the connectors 20, 30 when the connectors are wound against the take-up reel 19. While it is possible to provide additional apertures on the cassette's film leader 27, in the preferred embodiment, no such additional apertures are provided. The cassette's film leader 27 then acts to press the connectors 20, 30 inwardly through the apertures 57 toward the hub recess 60. Unless the film 13 and film leader 27 are fairly thick, some bulge will remain in the film 13 on the take-up reel 19. This bulge will be insignificant as long as it does not hinder the operation of the transport mechanism 11.

The displacement of the mated connectors 20, 30 toward the recess 60 may change the distance between the film leaders 27, 29. As previously mentioned, the position of the film 13 is controlled by the movement of a film 13 against the sprocket capstan 35. Therefore, any shifting in the distance between the film leaders 27, 29 after the film leaders 27, 29 are on the take-up reel 19 is irrelevant with respect to the accuracy of the positioning of the film information.

In the present embodiment, the supply reel 17 is driven by a drive connection 61 on the film transport mechanism 11 after the cassette 15 has been placed into a position on the film transport mechanism 11. It is also possible to provide other methods of driving the supply reel 17, such as the use of a separate motor in the cassette 15 or by the use of biasing means.

It should be noted that, while a single embodiment has been described, the present invention is useful with a plurality of systems in which a cassette is used to provide a web of material and the web of material is received on a take-up reel external to the cassette. It is particularly adapted to systems in which a mechanical connector pair is engaged by movement transverse to the movement of the web, so that all that is needed for engagement is an alignment of the connectors prior to engagement. It is possible to use the present invention with data means other than film strips, such as magnetic tape. These and other variations in the preferred embodiment being possible, it is desired that the present invention be limited only by the claims.

What is claimed is:

1. Loading system for loading a length of web supplied from a supply reel in a cassette into a web transport mechanism external to the cassette, in which the web transport mechanism includes a take-up reel for receiving the web, characterized by:
    (a) a first connector on the supplied web;
    (b) a second connector on the web transport mechanism, matable with the first connector;
    (c) the first and second connectors being engageable in a direction approximately perpendicular to the length of the web and parallel to the width of the web;
    (d) means, on the cassette, to releasably retain the first connector in a predetermined position when the first connector is not engaged with the second connector;
    (e) means to releasably retain the second connector in a predetermined position when the first connector is not engaged with the second connector, such that when the first and second connectors are in their predetermined positions and the cassette is inserted into the web transport mechanism, the connectors are in approximate alignment;
    (f) each connector retention means being able to release the connector in order to permit unrestrained movement of the web to the take-up reel;
    (g) a leader strip of web material being attached, at one end of the leader strip, to the take-up reel;
    (h) the second connector being connected to said leader strip at an end of the said leader strip opposite that of said leader strip's attachment to the take-up reel; and
    (i) the leader strip having material removed so as to allow the mated connectors to be wound about the take-up reel without creating a significant bulge in the take-up reel.

2. Apparatus as defined in claim 1, further characterized by:
    the take-up reel including a recess which aligns with the removed material when said leader strip is wound around said take-up reel so as to permit the mated connectors to substantially clear the remaining web as the web is wound about the take-up reel.

3. Apparatus as defined in claim 1, further characterized by:
    the material removed from the leader strip includes at least one aperture which, when the mated connectors are wound about the take-up reel, the aperture aligns with the mated connectors; and
    a recess on the take-up reel which aligns with the aperture and the mated connectors when the mated connectors are wound about the take-up reel so that the mated connectors may rest in the apertures and recess so as to avoid causing a significant bulge in the web as the web is wound about the take-up reel.

4. Apparatus as defined in claim 3, further characterized by:
    the web from the supply reel having further leader material which, when the web is wound about the take up reel, said further leader material presses against said mated connectors and displaces the mated connectors toward the recess in the take up reel, so as to further avoid a significant bulge in the web on the take-up reel.

5. Apparatus as defined in claim 3, further characterized by:
    the web from the take up reel having further leader material which, when the web is wound about the supply reel, said further leader material presses against said mated connectors and displaces the mated connectors toward the recess in the take up reel, so as to further avoid a significant bulge in the web on the take-up reel.

6. Apparatus as defined in claim 1, further characterized by:
    the web being photographic film.

7. Apparatus as described in claim 1, further characterized by:
    the web being photographic film and the web transport mechanism including means to transmit images from the film.

8. Apparatus as defined in claim 1, further characterized by:
    a retainer tab which is displaced by the second connector to a "release" position when the second connector is in said predetermined position and the tab being biased to a "lock" position, so that when the second connector is in the predetermined position, the cassette may be removed from the web transport mechanism and when the second connector is not in the predetermined position, the cassette is locked into the film transport mechanism.

9. Apparatus as defined in claim 7, further characterized by:
    a retainer tab which is displaced by the second connector to a "release" position when the second connector is in said predetermined position and the tab being biased to a "lock" position, so that when the second connector is in the predetermined position, the cassette may be removed from the web transport mechanism and when the second connector is not in the predetermined position, the cassette is locked into the film transport mechanism.

10. Web take-up reel and web leader combination in which the web leader receives a supplied web from a supply reel for feeding onto the take-up reel, characterized by:
    (a) the web including a plurality of a sprocket holes;
    (b) a first connector on the supplied web;

(c) a second connector, matable with the first connector, on the web leader;

(d) the first and second conectors being engageable in a direction approximately perpendicular to the length of the web;

(e) at least one aperture on said leader which, when the connectors are wound about the take-up reel, align with the connectors;

(f) a recess in the take-up reel which, when the connectors are wound about the take-up reel, aligns with the connectors and the aperture, so that when the supplied web is wound about the take-up reel, the aperture and recess in the take-up reel cooperate with the connectors to avoid the connectors causing a significant bulge in the take-up reel;

(g) the leader strip attached to the take-up reel having corresponding sprocket holes;

(h) the sprocket holes on the leader strip having a spacing and alignment such that when the connectors are mated, the sprocket holes on the leader strip and on the web suppled from the supply feel form a continuous series of sprocket holes;

(i) a sprocketed capstan over which said strip and said supplied web pass when wound toward the take-up reel; and (j) means, connected to the sprocketed capstan, providing a positive indication of the web's position in the web transport mechanism between the supply reel and the take-up reel.

11. Apparatus as described in claim 10, further characterized by:

the supplied web including a further leader, which presses against the mated connectors when the web is wound about the take-up reel, the pressing against the connectors causing the connectors to displace toward the recess, thereby further reducing a tendency of the film wound about the take-up reel to bulge.

12. Map reading apparatus for scanning images of a map on a film strip web including a film transport mechanism having a take-up reel and a film scanning device, and a cassette containing the film on a supply reel, characterized by:

(a) the film strip including a plurality of a sprocket holes;

(b) a first connector on the film strip;

(c) a leader strip of web being attached, at one end of the leader strip, to the take-up reel;

(d) a second connector being connected to said leader strip at an end of the said leader strip opposite that of said leader strip's attachment to the take-up reel;

(e) the first and second connectors being engageable in a direction approximately perpendicular to the length of the web;

(f) the direction of engagement of the connectors being parallel to the width of the web's surface, such that winding force exerted upon the web does not urge the connectors to disengage;

(g) means, on the cassette, to retain the first connector in a predetermined position when the first connector is not engaged with the second connector;

(h) means to position the second connector in a predetermined position when the first connector is not engaged with the second connector, such that when the first and second connectors are in their predetermined positions and the cassette is inserted into the web transport mechanism, the connectors are in approximate alignment;

(i) said connector retention means being able to release the connector in order to permit unrestrained movement of the web to the take-up reel;

(j) the leader strip including at least one aperture which, when the mated connectors are wound about the take-up reel, the aperture aligns with the mated connectors; and (k) a recess on the take-up reel which aligns with the aperture and the mated connectors when the mated connectors are wound about the take-up reel so that the mated connectors may rest in the apertures and recess so as to avoid causing a significant bulge in the web as the web is wound about the take-up reel;

(l) the leader strip attached to the take-up reel having corresponding sprocket holes;

(m) the sprocket holes on the leader strip having a spacing and alignment such that when the connectors are mated, the sprocket holes on the leader strip and on the web suppled from the supply reel form a continuous series of sprocket holes;

(n) a sprocketed capstan over which said strip and said supplied web pass when wound toward the take-up reel; and (o) means, connected to the sprocketed capstan, providing a positive indication of the web's position in the web transport mechanism between the supply reel and the take-up reel.

13. A cassette for a web which is inserted into a transport mechanism, in which the web is wound about a supply reel in the cassette and is withdrawn from the cassette onto a take-up reel on the transport mechanism, characterized by:

(a) a leader strip having a first connector being engageable with a second connector attached to the supply reel by a leader strip of web;

(b) the first connector being engageable with a second connector associated with the transport mechanism in a direction approximately perpendicular to the length of the web and parallel to the width of the web's surface, such that winding force exerted upon the web does not urge the members to disengage;

(c) retention means, on the cassette, to releasably retain the first connector in a predetermined position when the first connector is not engaged with the second connector;

(d) biasing means biasing the retention means against the first connector; and (e) means to restrain the retention means in its movement so as to permit unrestrained movement of the web to the take-up reel when said retention means is not engaging the first connector; and (f) a leader strip of web material being attached, at one end of the leader strip, to the take-up reel;

(g) the second connector being connected to said leader strip at an end of the said leader strip opposite that of said leader strip's attachment to the take-up reel; and (h) the leader strip having material removed so as to allow the mated connectors to be wound about the take-up reel without creating a significant bulge in the take-up reel.

14. Loading system for loading a length of web supplied from a supply reel in a cassette into a web transport mechanism external to the cassette, in which the web transport mechanism includes a take-up reel for receiving the web, characterized by:

(a) the web material including a plurality of sprocket holes;
(b) a first connector on the supplied web;
(c) a second connector on the web transport mechanism, matable with the first connector;
(d) the first and second connectors being engageable in a direction approximately perpendicular to the length of the web;
(e) means on the cassette to releasably retain the first connector in a predetermined position when the first connector is not engaged with the second connector;
(f) means to releasably retain the second connector in a predetermined position when the first connector is not engaged with the second connector such that when the first and second connectors are in their predetermined positions and the cassette is inserted into the web transport mechanism the connectors are in approximate alignment;
(g) each connector retention means being able to release the connector in order to permit unrestrained movement of the web to the take-up reel;
(h) the direction of engagement of the connectors being parallel to the web's surface, such that winding force exerted upon the web does not urge the connectors to disengage;
(i) a leader strip of web material being attached, at one end of the leader strip to the take-up reel;
(j) the second connector being connected to said leader strip at an end of the said leader strip opposite that of said leader strip's attachment to the take-up reel; and
(k) a retainer tab which is displaced by the second connector to a "release" position and the tab being biased to a "lock" position, so that when the second connector is in the predetermined position, the cassette may be removed from the web transport mechanism and when the second connector is not in the predetermined position, the cassette is locked into the film transport mechanism;
(l) the leader strip attached to the take-up reel having corresponding sprocket holes;
(m) the sprocket holes on the leader strip have a spacing and alignment such that when the connectors are mated, the sprocket holes on the leader strip and on the web supplied from the supply reel form a continuous series of sprocket holes;
(n) the web transport mechanism including a sprocketed capstan over which said leader strip and said supplied web pass when wound toward the take-up reel;
(o) means, connected to the sprocketed capstan, providing a positive indication of the web's position in the web transport mechanism between the cassette and the take-up reel; and
(p) the web being photographic film and the web transport mechanism including means to transmit images from the film.

* * * * *